: US006378910B1

United States Patent
Maiman

(10) Patent No.: US 6,378,910 B1
(45) Date of Patent: Apr. 30, 2002

(54) PLUMBER'S FLANGE AND METHOD FOR USING THE SAME

(76) Inventor: Steven Maiman, 19 Lehigh Dr., Somers Point, NJ (US) 08244

(*) Notice: Subject to any disclaimer, the term of this patent is extended or adjusted under 35 U.S.C. 154(b) by 0 days.

(21) Appl. No.: 09/409,191

(22) Filed: Sep. 30, 1999

(51) Int. Cl.$^7$ ................................................. F16L 5/00
(52) U.S. Cl. ........................... 285/46; 285/64; 137/359; 52/220.8
(58) Field of Search ........................... 285/405, 46, 64, 285/225, 205; 137/359; 52/220.8

(56) References Cited

U.S. PATENT DOCUMENTS

| | | | |
|---|---|---|---|
| 35,515 A | * 6/1862 | Gibson et al. ................. 285/46 |
| 98,674 A | * 1/1870 | Douglas .................. 285/142.1 |
| 576,521 A | * 2/1897 | Staple ..................... 285/142.1 |
| 1,115,696 A | 11/1914 | Linbarger | |
| 1,214,220 A | 1/1917 | Regar | |
| 2,773,708 A | 12/1956 | Beyerle | |
| 2,851,286 A | * 9/1958 | Bishop ........................ 285/46 |
| 3,009,167 A | 11/1961 | Leonard, Jr. | |
| 3,249,378 A | * 5/1966 | Sees et al. .................. 285/225 |
| 3,540,065 A | * 11/1970 | Gidner et al. ................. 285/64 |
| 3,936,589 A | * 2/1976 | Teeters, Sr. et al. .......... 285/64 |
| 4,071,267 A | 1/1978 | Davis | |
| 4,407,531 A | * 10/1983 | Raush et al. ............. 285/142.1 |
| 4,473,244 A | 9/1984 | Hill | |
| 4,550,451 A | * 11/1985 | Hubbard ...................... 285/64 |
| 4,748,787 A | 6/1988 | Harbeke | |
| 4,804,160 A | 2/1989 | Harbeke | |
| 4,804,211 A | * 2/1989 | Larson et al. ............... 285/225 |
| 4,920,708 A | 5/1990 | Mac Leod et al. | |
| 5,236,228 A | * 8/1993 | Lawton ................... 285/148.25 |
| 5,456,050 A | * 10/1995 | Ward .......................... 52/220.8 |
| 5,598,670 A | * 2/1997 | Humphrey et al. ......... 52/220.8 |
| 5,803,508 A | 9/1998 | Lowella | |

FOREIGN PATENT DOCUMENTS

| | | | |
|---|---|---|---|
| GB | 2 114 694 A | 8/1983 | |
| JP | 224590 | * 9/1989 | .................. 285/64 |
| JP | 402199390 | * 8/1990 | .................. 285/64 |

* cited by examiner

Primary Examiner—Eric K. Nicholson
(74) Attorney, Agent, or Firm—Norman E. Lehrer

(57) ABSTRACT

When running pipes or lines through a wall of a structure a hole is drilled in the wall during fabrication of the structure and then the line or pipe is run through the hole and to the outside of the building. Hose bibs or sill cocks typically include a faucet-like member and a base with notches located on opposite sides of the base. The hose bib attaches to the pipe and the hose bib is secured to the outside wall of the building usually by screws. A problem which frequently occurs with this practice, however, is that the pre-formed hole is too large so that the hose bib or sill cock cannot be secured to the wall. That is, there isn't anything to which the screws may attach. The present invention seeks to correct this problem by providing a flat, essentially diamond-shaped plate with a plurality of holes located therein. A hole larger than the other holes is located in the center of the plate. A hose bib having a base with notches located on opposite sides of the base is mounted to the plate so as to align the hose bib with the central hole. Each of the notches of the base is aligned with a hole located on either side of the central hole. Screws are then inserted into the notches and through their respective holes, thereby securing the hose bib to the plate. The plate is then secured to the wall.

4 Claims, 3 Drawing Sheets

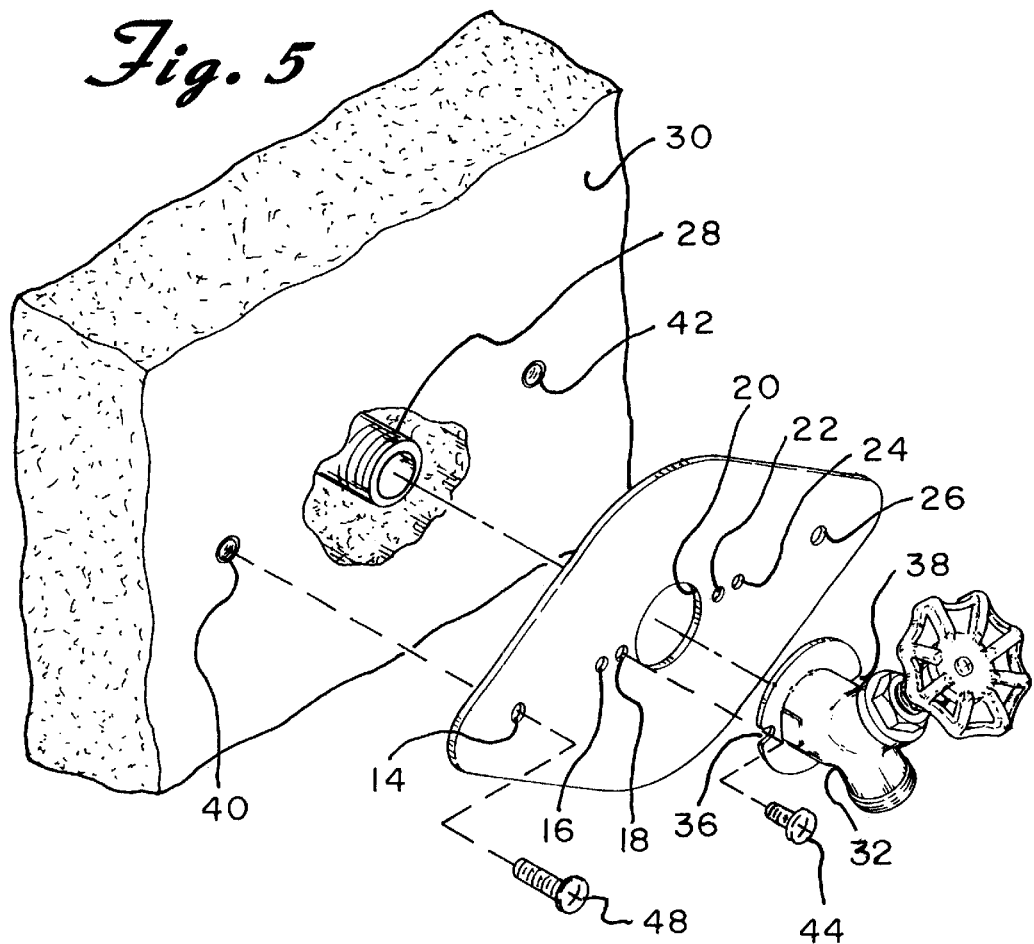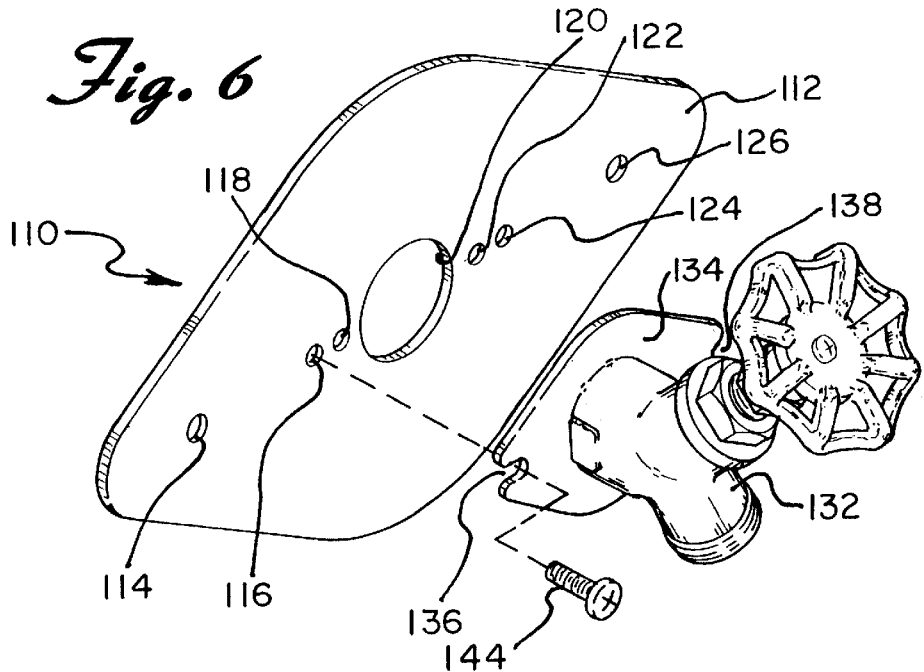

PLUMBER'S FLANGE AND METHOD FOR USING THE SAME

BACKGROUND OF THE INVENTION

The present invention is directed toward a flange and more particularly, toward a flange which may be used to correct the size of a hole, such as for a water pipe, found on the outside of a building.

The common practice in the plumbing industry for running pipes or lines through a wall of a structure is to drill a hole in the wall during fabrication of the structure and then to run the line or pipe through the hole and to the outside of the building. A hose bib or sill cock 232 is then attached to the pipe outside of the building and acts as a faucet. (see FIG. 1.) Hose bibs or sill cocks typically include a faucet-like member 233 attached to a base 234 having notches 236 and 238 located on opposite sides of the base 234. The base may be in various forms such as generally circular or diamond-shaped. The hose bib 232 is attached to the pipe 228 and is secured to the outside wall 230 of the building via screws 244 and 246 which are screwed through the notches 236 and 238 and to the wall 230. A problem which frequently occurs with this practice, however, is that the pre-formed hole is too large so that the hose bib or sill cock cannot be secured to the wall. That is, there isn't anything to which the screws may attach. (See FIG. 2.) Currently, a quick and inexpensive solution to this problem is lacking.

U.S. Pat. No. 4,920,708 to MacLeod et al. discloses a wall mounting assembly for use with siding. The assembly includes a large back plate which provides a means for securing various other devices to the outside of a building. For example, the device may be use for passage of a water pipe or the like to the exterior of the building. However, this patent does not provide for correcting the size of a pre-formed hole.

SUMMARY OF THE INVENTION

The present invention is designed to overcome the deficiencies of the prior art discussed above. It is an object of the present invention to provide a flange which corrects the size of a hole in the wall of a building.

It is a further object of the present invention to provide a versatile and simple device for correcting the size of a hole.

It is another object of the present invention to provide a device mounted to the outside wall of a building in order to help secure a hose bib or sill cock thereto.

In accordance with the illustrative embodiments demonstrating features and advantages of the present invention, there is provided a flat, essentially diamond-shaped plate with a plurality of holes located therein. A hole larger than the other holes is located in the center the plate. A hose bib having a base with notches located on opposite sides of the base is mounted to the plate so as to align the hose bib with the central hole. Each of the notches of the base is aligned with a hole located on either side of the central hole. Screws are then inserted into the notches and their respective holes, thereby securing the hose bib to the plate. The plate is then secured to the wall.

Other objects, features, and advantages of the invention will be readily apparent from the following detailed description of the preferred embodiments thereof taken in conjunction with the drawings.

BRIEF DESCRIPTION OF THE DRAWINGS

For the purpose of illustrating the invention, there is shown in the accompanying drawings forms which are presently preferred; it being understood that the invention is not intended to be limited to the precise arrangements and instrumentalities shown.

FIG. 5 is an exploded view of the flange of the present invention securing the hose bib to the outer wall of the building; and FIG. 6 is an exploded view of a second embodiment of the flange of the present invention being used with another type of hose bib.

DETAILED DESCRIPTION OF THE PREFERRED EMBODIMENTS

Figure 1:
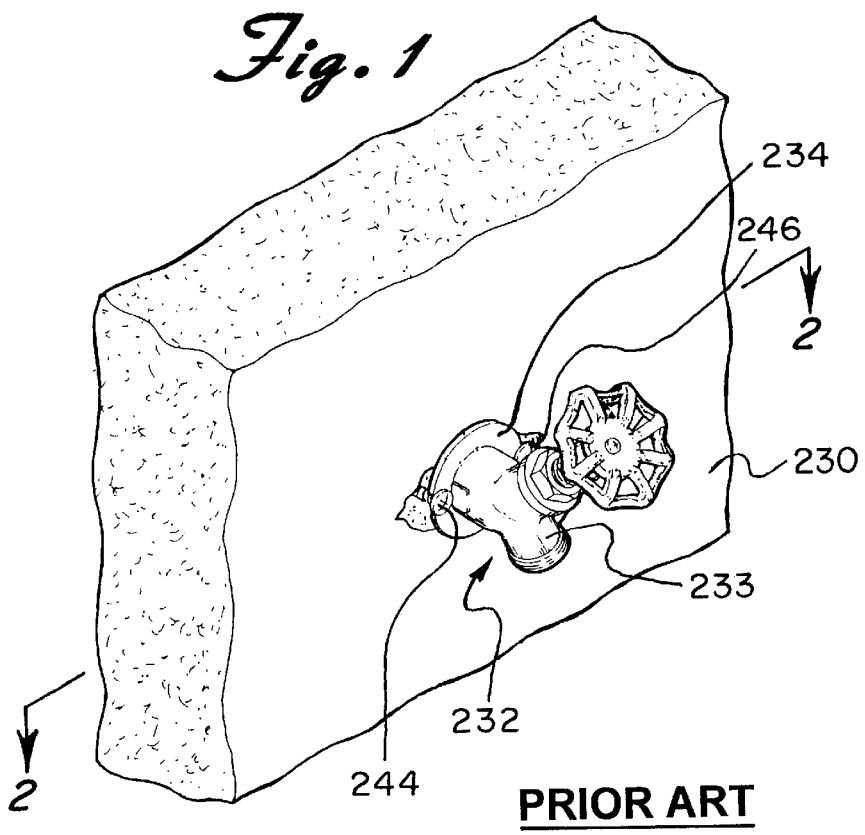
FIG. 1 is a schematic representation of a prior art hose bib attached to the outer wall of a building.
Figure 2:
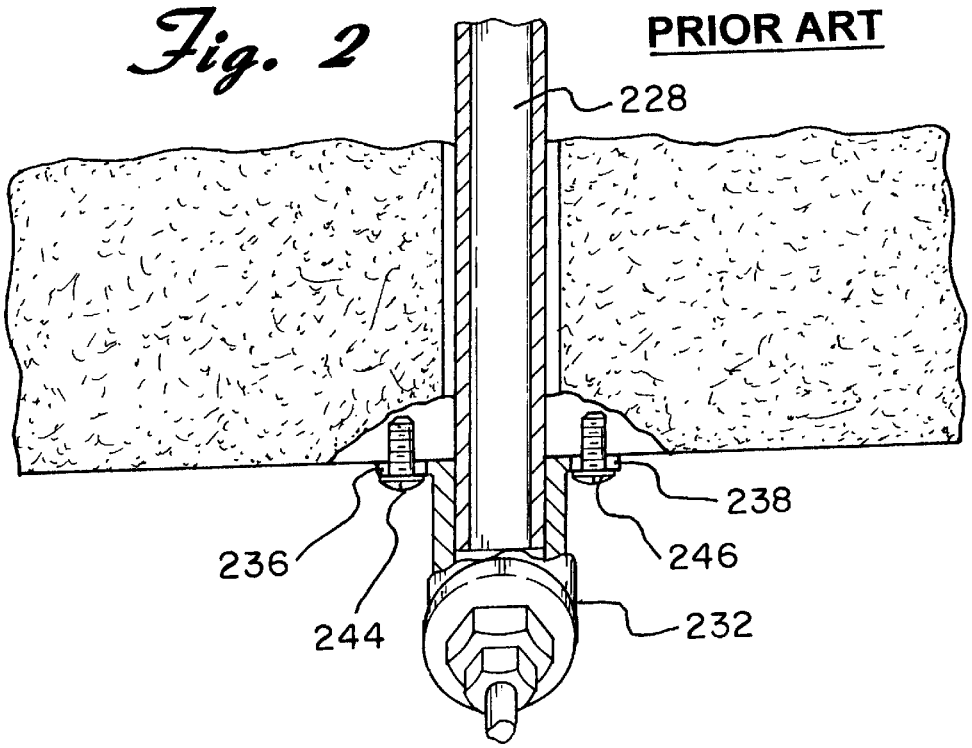
FIG. 2 is a cross-sectional view taken through line 2—2 of FIG. 1.
Figure 3:
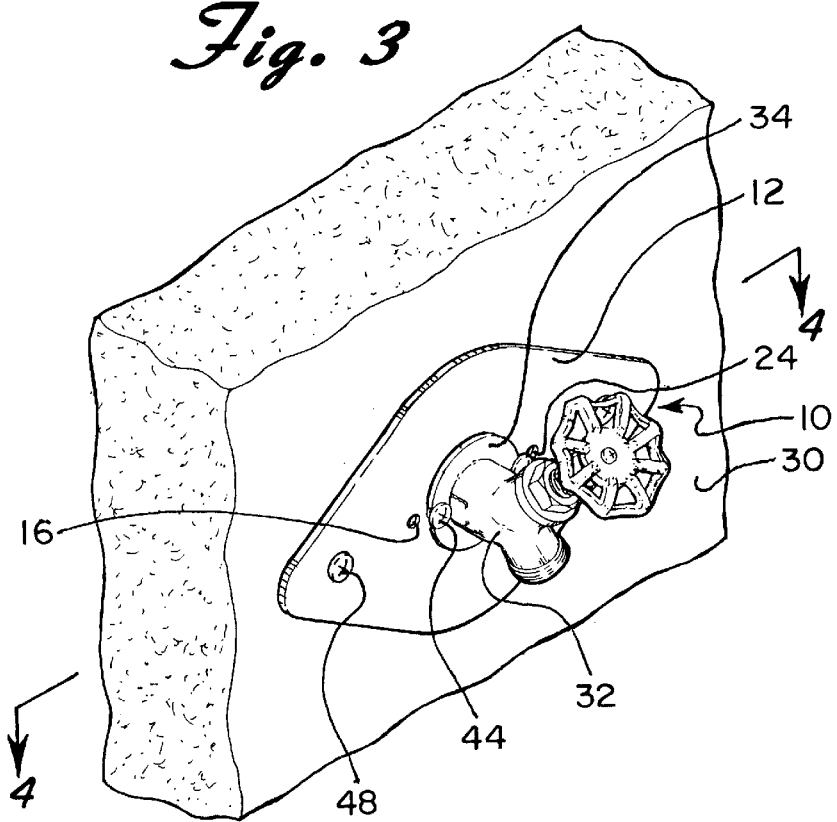
FIG. 3 is schematic representation of the flange of a first embodiment of the present invention which secures one type of hose bib to an outer wall of a building.

Referring now to the drawings in detail wherein like reference numerals have been used throughout the various figures to designate like elements, there is shown in FIG. 3 a flange constructed in accordance with the principles of the present invention and designated generally as 10.

The flange 10 of the first embodiment of the present invention essentially includes a flat, elongated plate 12 with a plurality of holes 14, 16, 18, 20, 22, 24, and 26 located therein. The holes 14, 16, 18, 20, 22, 24, and 26 are spaced apart from each other and are located generally in a straight line near the center of the plate 12 and along the length of the plate 12. (See FIG. 5.) Preferably, the distance from hole 16 to hole 24 is approximate 2¼ inches and the distance from hole 18 to hole 22 is approximately 1⅝ inches. Hole 20 is larger than the other holes and is located in the center of the plate 12. While seven holes are shown, it should be realized that the number of holes, the sizes of the holes, and the distance between the holes may vary. The flange may be made from metal or the like material and may be substantially diamond-shaped.

Figure 4:
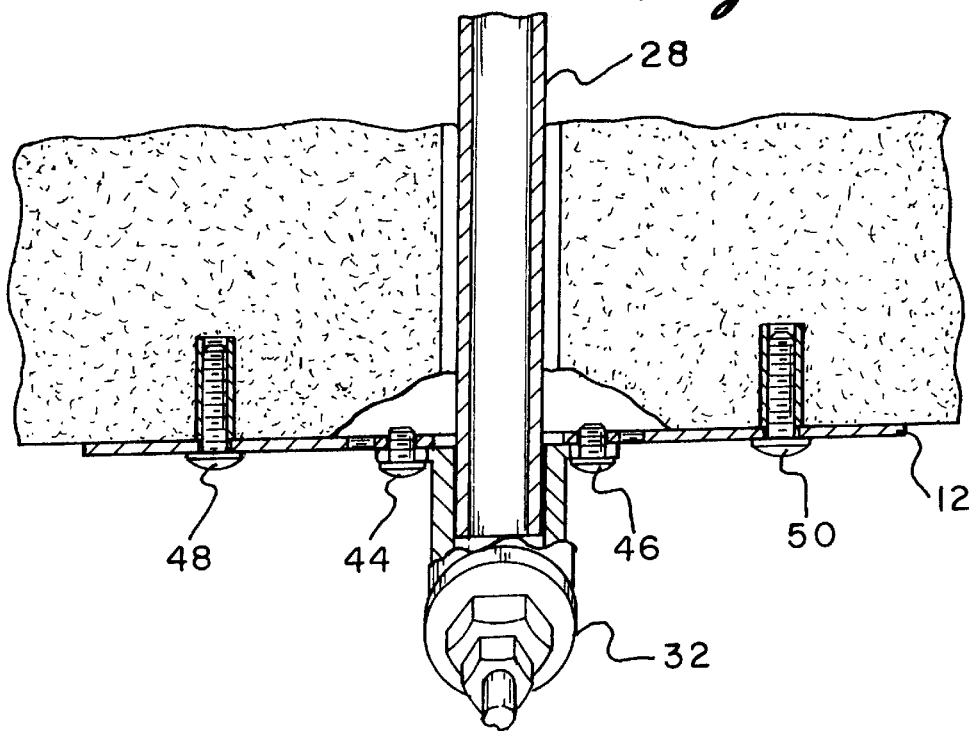
FIG. 4 is a cross-sectional view taken through line 4—4 of FIG. 3.

In order to use the flange 10 of the present invention the flange is aligned with a pipe 28 extending through an outside wall 30 of a building so that the pipe 28 extends through hole 20. (See FIG. 4.) A hose bib 32 having a base 34 is aligned with the hole 20 so that the hose bib 32 is fastened onto the pipe 28 and the base 34 of the hose bib 32 surrounds he hole 20. Notches 36 and 38 located on opposite sides of the base 34 are aligned with holes 18 and 22, respectively. (See FIG. 5.) Holes 40 and 42 may be drilled into t he wall 30 which are then aligned with holes 14 and 26, respectively, of the flange 10. Securing means, for example, a screw 44 is then aligned with notch 36 and screw 46 is aligned with notch 38 and used to secure the hose bib 32 to the flange 10 via pre-threaded screw holes 18 and 22, respectively. Likewise, securing means such as a screw 48 is inserted through holes 14 and 40 and a screw 50 is inserted through boles 26 and 42 in order to secure the flange 10 to the wall 30. (See FIGS. 4 and 5.)

The flange of the present invention allows for a wide variety of hose bibs to be used therewith a accommodates all standard hose bibs. That is, the hose bib may vary in size and shape. FIG. 5, for example, illustrates a hose bib with a generally circular base. FIG. 6 illustrates a generally diamond-shaped base. The flange may be of any size and shape as long as the purposes of the flange are not defeated. That is, the flange should be large enough to be able to correct the size of a hole in the wall of a building and be able to be mounted to the wall of the building. However, in a preferred embodiment, the flange may have a height of approximately 5½ inches and a width approximately 7¼ inches.

In a second embodiment of the present invention the flange 110, shown in FIG. 6, may be used th a diamond-shaped hose bib in the same manner as the hose bib shown in FIG. 5 and described above. That is, the flange 110 is aligned with a pipe extending through an outside wall of a building so that the pipe extends through the hole 120. A hose bib 132 having a base 134 is aligned with the hole 120 so that the hose bib 132 is fastened onto the pipe and the base 134 of the hose bib 132 surrounds the hole 120. Notches 136 and 138 located on opposite sides of the base 134 are aligned with holes 116 and 124, respectively.

Holes may be drilled into the wall which align with holes 114 and 126 of the flange. A screw is then aligned with notch 136 and hole 116 and a screw is aligned with notch 138 and hole 124 which are used to secure the hose bib 132 to the flange 110. By way of example, screw 144 is shown being inserted through notch 136 and into pre-threaded hole 116. Likewise, securing means such as elongated screws or the like are inserted through holes 114 and 126 in order to secure the flange 110 to the wall.

The present invention may be embodied in other specific forms without departing from the spirit or essential attributes thereof and accordingly, reference should be made to the appended claims rather than to the foregoing specification as indicating the scope of the invention.

I claim:

1. The combination of a flange and an outer wall of a building, the outer wall having a pre-formed hole therein, said flange comprising a single generally flat, elongated plate with a plurality of holes formed therein, at least one of said holes being located in the center of said plate and being adapted to receive a hose bib, and means for securing said plate directly to said outer wall of the building wherein said securing means extend into the outside surface of said outer wall at positions remote from said pre-formed hole.

2. The method for securing a hose bib to an outer wall of a building of claim 1 wherein said base is generally circular.

3. The method for securing a hose bib to an outer wall of a building of claim 1 wherein said base is generally diamond-shaped.

4. The method for securing a hose bib to an outer wall of a building of claim 1 wherein said plate is substantially diamond-shaped.

* * * * *

UNITED STATES PATENT AND TRADEMARK OFFICE
CERTIFICATE OF CORRECTION

PATENT NO.    : 6,378,910 B1
DATED         : April 30, 2002
INVENTOR(S)   : Steven Maiman It is certified that error appears in the above-identified patent and that said Letters Patent is hereby corrected as shown below:

<u>Column 4,</u>
Line 7, Claim 1 should read:

1. A method for securing a hose bib to an outer wall of a building comprising the steps of:
    providing a single generally elongated, flat plate with a plurality of holes formed therein and least one of said holes located in the center of said plate and being adapted to receive a hose bib;
    providing a hose bib having a base with notches located on opposite sides of said base;
    mounting said hose bib onto said plate so as to align said notches of said base with two of said plurality of holes;
    inserting securing means through said notches and two of said plurality of holes for securing said hose bib to said plate;
    providing means for securing said plate directly to said outer wall; and
    securing said plate directly to said outer wall by extending said plate securing means into the outside surface of said outer wall at positions remote from said pre-formed hole.

Signed and Sealed this

Twenty-fourth Day of December, 2002

JAMES E. ROGAN
*Director of the United States Patent and Trademark Office*